United States Patent
White et al.

(10) Patent No.: US 8,534,770 B2
(45) Date of Patent: Sep. 17, 2013

(54) PRECISION AXLE SPINDLE AND WHEEL END ASSEMBLY FOR HEAVY-DUTY VEHICLES

(75) Inventors: Jay D. White, Massillon, OH (US); Jeffrey S. Morris, Stow, OH (US); Donald R. Hester, East Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 168 days.

(21) Appl. No.: 12/790,054

(22) Filed: May 28, 2010

(65) Prior Publication Data
US 2010/0301665 A1 Dec. 2, 2010

Related U.S. Application Data

(60) Provisional application No. 61/182,277, filed on May 29, 2009.

(51) Int. Cl.
*B60B 27/02* (2006.01)

(52) U.S. Cl.
USPC .................. 301/105.1; 301/111.03; 384/544

(58) Field of Classification Search
USPC ................ 301/105.1, 111.01, 112, 114, 115, 301/116, 122, 111.03, 111.07, 124.1; 411/197, 411/199, 216, 217, 218, 221, 926, 533; 384/544
See application file for complete search history.

(56) References Cited

U.S. PATENT DOCUMENTS

| 2,622,934 A | 12/1952 | Phelps |
| 2,634,169 A | 4/1953 | Martin |
| 2,956,632 A | 5/1959 | Forbush et al. |
| 3,294,141 A | 12/1966 | Schotthoefer et al. |
| 3,453,720 A | 7/1969 | Gerard |

(Continued)

FOREIGN PATENT DOCUMENTS

| DE | 19827073 A1 | 1/2000 |
| DE | 20121339 U1 | 8/2002 |

(Continued)

OTHER PUBLICATIONS

Meritor Heavy Vehicle Systems, LLC, DaytonLite™ Hubs brochure, Apr. 2000.

(Continued)

*Primary Examiner* — Kip T Kotter
(74) *Attorney, Agent, or Firm* — Dureska, Kennedy & Moore, LLC; David P. Dureska; Edward T. Kennedy (57) ABSTRACT

An axle spindle and wheel end assembly includes a precision-formed axle spindle, wheel hub, and axle spindle nut. The axle spindle is formed with parallel inboard and outboard bearing surfaces, a shoulder that is perpendicular to the inboard and outboard bearing surfaces, and threads for a spindle nut that are aligned with the inboard and outboard bearing surfaces. The wheel hub is formed with inboard and outboard bearing surfaces that are in parallel alignment with one another, and bearing axial stop surfaces that are perpendicular to the wheel hub bearing surfaces. The spindle nut is formed with threads on its inner periphery and a flat inboard surface that is perpendicular to the threads. The axle spindle, wheel hub, and spindle nut cooperate to enable an axle spindle nut assembly to consistently provide a light preload on a bearing cone and spacer group of the wheel end assembly.

14 Claims, 6 Drawing Sheets

(56) References Cited

U.S. PATENT DOCUMENTS

| | | | |
|---|---|---|---|
| 3,762,455 A | 10/1973 | Anderson, Jr. | |
| 3,844,323 A | 10/1974 | Anderson, Jr. | |
| 4,121,871 A | 10/1978 | Adams, Jr. | |
| 4,986,608 A | 1/1991 | Fett | |
| 5,052,979 A | 10/1991 | Welschof et al. | |
| 5,090,778 A | 2/1992 | Laudszun et al. | |
| 5,094,117 A | 3/1992 | Mikel et al. | |
| 5,328,275 A | 7/1994 | Winn et al. | |
| RE34,822 E | 1/1995 | Mattson | |
| D381,615 S | 7/1997 | Smith et al. | |
| 5,757,084 A | 5/1998 | Wagner | |
| 5,795,037 A | 8/1998 | Hagelthorn | |
| 5,997,103 A | 12/1999 | Wagner | |
| 6,149,244 A | 11/2000 | Wagner | |
| 6,272,943 B1 * | 8/2001 | Lais et al. | 74/425 |
| 6,491,440 B1 | 12/2002 | Sahashi et al. | |
| D470,447 S | 2/2003 | Orey | |
| 6,533,363 B1 | 3/2003 | Hayes et al. | |
| 6,729,769 B2 | 5/2004 | Sahashi et al. | |
| 6,935,788 B2 | 8/2005 | Stanczak et al. | |
| 7,506,940 B2 | 3/2009 | White | |
| 2007/0052287 A1 | 3/2007 | White et al. | |
| 2009/0245969 A1 | 10/2009 | White et al. | |

FOREIGN PATENT DOCUMENTS

| | | |
|---|---|---|
| EP | 0733494 A2 | 9/1996 |
| FR | 2136423 A | 12/1972 |
| WO | 9742425 A | 11/1997 |
| WO | 9748919 A | 12/1997 |
| WO | 2007030221 A1 | 3/2007 |

OTHER PUBLICATIONS

Hendrickson Trailer Suspension Systems, Wheel-End Options brochure, Jul. 2000.

Eaton Corporation, Eaton Truck Components Bulletin ABIB-9703, 2001.

Hendrickson Trailer Suspension Systems, Wheel-End Hendrickson Unitized System (HUS™) brochure, Nov. 2001.

Meritor Heavy Vehicle Systems, Long-life Trailer Wheel-End Systems brochure, Mar. 2002.

Hendrickson Trailer Suspension Systems, Vantraax® brochure, Mar. 2004.

Hendrickson Trailer Suspension Systems, Wheel-End Hendrickson Long-life System (HLS™) brochure, Nov. 2004.

Consolidated METCO Inc., PreSet® Hub Assemblies brochure, Feb. 2005.

STEMCO LP, Pro-Torq® An Axle Spindle Nut System for Today's Fleets brochure, Mar. 2005.

Hendrickson Trailer Suspension Systems, Technical Procedure INTRAAX® Suspension Systems, Wheel-End Maintenance Procedures manual, Apr. 2005.

Otto Sauer Achsenfabrik GMBH (SAF), General Operating and Service Manual, SAF Air suspension systems and axles with disc brakes, Dec. 2006.

Hendrickson Trailer Suspension Systems, QUAANTUM™ FX Air-Ride Suspension Systems brochure, Feb. 2007.

Photographs of a hubcap and spindle nut manufactured by Discos. Photographs taken in about May 2007.

The Timken Company, page from Wheel Boss® Wheel-End System web site, as displayed in May 2007.

Penton Media, Inc., Bulk Transporter, Timken crafts Wheel Boss for longer life web page, as displayed in May 2007.

Hendrickson Trailer Suspension Systems, Technical Procedure INTRAAX® QUAANTUM™ FX brochure, Dec. 2007.

Hendrickson Trailer Suspension Systems, WEM™ Wheel-End Monitor brochure, Apr. 2008.

Hendrickson Trailer Suspension Systems, INTRAAX® AANL 9 t, Integrated Trailer Axle and Air Suspension System brochure, Aug. 2008.

Hendrickson Trailer Suspension Systems, Wheel End HNP™ System brochure, Jan. 2009.

* cited by examiner

PRECISION AXLE SPINDLE AND WHEEL END ASSEMBLY FOR HEAVY-DUTY VEHICLES

CROSS-REFERENCE TO RELATED APPLICATIONS

This application claims the benefit of U.S. Provisional Patent Application Ser. No. 61/182,277, which was filed on May 29, 2009.

BACKGROUND OF THE INVENTION

1. Technical Field

The invention relates to vehicle axles and wheel end assemblies, and in particular to axles and wheel end assemblies for heavy-duty vehicles, such as tractor-trailers. More particularly, the invention is directed to a heavy-duty axle spindle and wheel end assembly that includes a precision-formed axle, wheel hub, and axle spindle nut which cooperate to enable the axle spindle nut to achieve a precise position and thus provide a desirable light preload on the bearings of the wheel end assembly.

2. Background Art

For many years, the heavy-duty vehicle industry has utilized wheel end assemblies which are mounted on each end of one or more non-drive axles. Each wheel end assembly typically includes a hub rotatably mounted on a bearing assembly that in turn is immovably mounted on the outboard end of the axle, commonly known as an axle spindle. The bearing assembly includes an inboard bearing and an outboard bearing, which may be separated by a bearing spacer. An axle spindle nut assembly secures the bearing assembly on the axle spindle by threadably engaging threads that are cut into the outer diameter of the outboard end of the axle spindle. In addition to retaining the position of the bearings and any spacer, the axle spindle nut assembly may be used to provide a clamp force to compress the bearings, and any bearing spacer, to a predetermined amount.

As is well known to those skilled in the art, for normal operation of the wheel end assembly to occur, the bearing assembly and surrounding components must be lubricated with grease or oil. Therefore, the wheel end assembly also must be sealed to prevent leakage of the lubricant, and also to prevent contaminants from entering the assembly, both of which could be detrimental to its performance. More specifically, a hubcap is mounted on an outboard end of the wheel hub adjacent to and outboard from the axle spindle nut assembly, and a main seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, bearing spacer, axle spindle nut assembly, hubcap, main seal, and other components, as well as the axle spindle, vary according to the specific vehicle design and its anticipated uses. Moreover, the design and construction of prior art axle spindles, wheel hubs and axle spindle nuts exhibit certain disadvantages associated with installation and maintenance of an optimum position of the spindle nut to provide the proper clamp force to compress the bearings.

More particularly, the clamp force that compresses the bearings involves the placement of force by the axle spindle nut on the cones of the bearings and any spacer between the bearings, which are known in the art as a bearing cone and spacer group. For the purpose of convenience, reference herein shall be made to the bearing cone and spacer group with the understanding that such reference includes applications which utilize a bearing spacer, and applications which do not utilize a bearing spacer. Placement of the proper amount of force on the bearing cone and spacer group helps to optimize the life of the bearings by controlling the tolerance range of the end play of the bearings.

For example, if the position of the axle spindle nut does not create a sufficient clamp force on the bearing cone and spacer group, there may be excessive end play of the bearings, which in turn creates excessive axial end play of the wheel end assembly relative to the axle spindle. Such excessive end play may allow undesirable movement of the main seal, which in turn potentially reduces the life of the main seal and the bearings. If the position of the axle spindle nut creates a clamp force on the bearing cone and spacer group that is too high, the bearings may effectively be over-compressed, interfering with their rotation and causing them to potentially wear out prematurely.

An optimum position of the axle spindle nut creates an optimum clamp force on the bearing cone and spacer group that ideally places the bearing cone and spacer group into what is known in the art as light preload. Light preload is an optimized compression of the bearing cone and spacer group that effectively is between a lack of clamp force that results in some axial end play of the wheel end assembly, and a higher clamp force which over-compresses the bearings. Light preload is advantageous when compared to a lack of clamp force that results in even a small amount of axial end play, because it restricts axial movement of the wheel end assembly, and thus significantly enhances and extends the fatigue life of the bearings and the main seal. Light preload is also advantageous when compared to a clamp force that results in over-compression of the bearings, since the light preload does not over-compress the bearings, and thus extends their fatigue life. The extension of bearing and main seal life desirably reduces the cost, effort and time that are required to remove a vehicle from service to replace worn bearings and main seals.

However, placing a light preload on the bearing cone and spacer group involves a very narrow and precise range of clamp force, which requires an extremely precise position of the axle spindle nut, making the light preload condition extremely difficult to achieve and maintain. In the prior art, the development of components that can consistently and reliably create a uniform light preload condition has not been accomplished. This has been due primarily to the lack of a precision-formed axle, wheel hub, and axle spindle nut which cooperate to enable the spindle nut to consistently achieve and maintain a precise position, and thus a light preload condition. As a result, manufacturers have instead designed axle spindle and wheel end assemblies to employ a position of the axle spindle nut that results in a certain amount of axial end play, having determined that, while not optimal, it is a more desirable condition than a position of the axle spindle nut which results in a clamp force that over-compresses the bearings.

For example, on prior art axle spindle and wheel end assemblies that employ wheel hubs with high-end, specialized unitized bearings or bearing cartridge systems, undesirably high tightening torques in excess of 500 foot-pounds are required. Such high torques do not allow consistent repeatability of a precise axle spindle nut position and thus a proper clamp force that is able to maintain a light preload condition. As a result, such axle spindle and wheel end assemblies must instead employ a range of adjustment or position of the axle spindle nut which includes axial end play at one end of the range, up to a clamp force that creates a light preload condition at the other end of the range. For example, the range may be from about 0.001 inches of axial end play to about 0.001 inches of preload on the most precise systems, and from about 0.003 inches of axial end play to about 0.003 inches of preload on less precise systems.

Other axle spindle and wheel end assemblies employ more standard bearings with a bearing spacer. These assemblies have a moderate tightening torque, but the tolerances associated with the manufacturing of the bearing spacer preclude the repeatable precision that is needed to achieve a light preload condition. As a result, such axle spindle and wheel end assemblies employ a range of adjustment or position of the axle spindle nut which includes axial end play of the wheel end assembly from about 0.001 inches to about 0.006 inches. Such a range of adjustment or position of the axle spindle nut is preferable to attempting a light preload with an imprecise system, thereby ensuring that the system does not create an unknown preload condition that over-compresses the bearings.

Still other axle spindle and wheel end assemblies have even less repeatable precision of the position of the axle spindle nut. Due to such imprecision, these assemblies also employ a position of the axle spindle nut that results in axial end play of the wheel end assembly, so as to avoid the inadvertent creation of an unknown and non-measurable preload condition that may over-compress the bearings.

Even when a relatively precise axle spindle nut is employed, such as a spindle nut having features as described in U.S. Patent Application Publication No. 2009/0245969, which is owned by the same assignee as the present application, Hendrickson USA, L.L.C., a repeatable light preload condition cannot be consistently obtained unless the axle spindle and wheel hub interfaces are precisely and accurately formed to cooperate with one another and with the spindle nut.

More particularly, a wheel hub must be formed with a bearing surface for the inboard bearing and a bearing surface for the outboard bearing. In the prior art, many manufacturers of wheel hubs have machined or finished the bore for one bearing surface from one direction using a first fixture to hold the hub, and have then machined or finished the bore for the second bearing surface from another direction by turning the wheel hub over and using a second fixture to hold the hub. This process of using two separate fixtures is referred to in the art as a multi-chuck system, and such multi-chuck systems use separate locating surfaces to machine the bore for the first bearing surface and the bore for the second bearing surface. In a multi-chuck system, a machining chip or other contaminant could be captured on one of the locating surfaces, which in turn causes the bores for the bearing surfaces to be machined out of alignment.

If this misalignment is not severe, the wheel hub may still function acceptably when the axle spindle and wheel end assembly is set to operate with axial end play, as excessive compression of the bearings due to the misalignment may not be experienced. However, the optimum bearing fatigue life is not obtainable using such a wheel hub in conjunction with an axle spindle nut position that allows axial end play. In addition, if a clamp force that achieves a light preload is attempted with such a hub, it is likely that the bearings will inadvertently be overloaded or over-compressed due to non-uniform loading caused by the aforementioned misalignment of the bores of the bearing surfaces.

In addition, the prior art forming processes for axle spindles contribute to the lack of precision of the system. That is, the axle spindle includes a bearing surface for the inboard bearing, a bearing surface for the outboard bearing, and threads for the axle spindle nut. In many cases, the spindle threads are not cut at the same time as the bearing surfaces are finished. For example, some axle manufactures cut the spindle thread into the axle spindle before friction welding the spindle to an axle central tube to save processing time, and will then finish the bearing surfaces after the friction welding process. Friction welding the axle spindle to the axle central tube may create variation in alignment of the opposite spindles on the axle, which results in the spindle threads being tipped or out of alignment relative to the bearing surfaces on the spindle. When the wheel end assembly is set to operate with axial end play relative to the axle, an axle with spindle threads that are not aligned with the bearing surfaces on the spindle may still function acceptably. However, if a clamp force that achieves a light preload is attempted, it is likely that the bearings will inadvertently be overloaded or over-compressed due to non-uniform loading caused by the misalignment of the axle spindle threads to the spindle bearing surfaces.

Moreover, even a relatively precise axle spindle nut must have certain features in order to ensure that the system is precise enough to obtain a consistent light preload condition. More particularly, axle spindle nuts typically do not include threads that are accurately or precisely positioned perpendicular to the inboard surface of the nut, due to separate machining processes and/or separate locating surfaces for machining the inboard surface of the nut and for forming the threads in the nut. Since axle spindle nuts of the prior art typically do not include threads that are precisely perpendicular to the inboard surface of the nut, consistent achievement of a light preload condition is precluded.

As a result, prior art axle spindle and wheel end assemblies lack the necessary precision on the critical surfaces of the axle spindle, wheel hub and axle spindle nut to enable the axle spindle nut to achieve a precise position and thus in turn achieve a consistent, desirable light preload condition in clamping the bearing cone and spacer group of the wheel end assembly. These disadvantages of prior art axle spindle and wheel end assemblies make it desirable to develop a heavy-duty axle spindle and wheel end assembly that includes a precision-formed axle, wheel hub, and axle spindle nut which cooperate to enable the axle spindle nut to consistently achieve a precise position and thus provide a light preload on the bearing cone and spacer group of the wheel end assembly. The present invention satisfies these needs, as will be described below.

BRIEF SUMMARY OF THE INVENTION

An objective of the present invention is to provide a heavy-duty axle spindle and wheel end assembly that includes a precision-formed axle, wheel hub, and axle spindle nut which cooperate with one another to enable the axle spindle nut to consistently achieve a precise position and thus provide a light preload on the bearing cone and spacer group of the wheel end assembly.

This objective and others are obtained by the precision-formed axle spindle and wheel end assembly combination for a heavy-duty vehicle of the present invention. In an exemplary embodiment of the invention, an precision-formed axle spindle is formed with a bearing surface for an inboard bearing and a bearing surface for an outboard bearing disposed longitudinally outboardly of the inboard bearing surface. The axle spindle inboard and outboard bearing surfaces are in parallel alignment with one another. The axle spindle is also formed with a shoulder for retaining the longitudinal position of the inboard bearing, in which the shoulder is perpendicular to the axle spindle inboard an outboard bearing surfaces. The axle spindle is further formed with threads for receiving a spindle nut, in which the axle spindle threads are aligned with the axle spindle inboard and outboard bearing surfaces. A wheel end assembly is rotatably mounted on the axle spindle, and includes the inboard bearing immovably mounted on the axle spindle at the axle spindle inboard bearing surface and the shoulder, the outboard bearing immovably mounted on the axle spindle at the axle spindle outboard bearing surface, and a wheel hub rotatably mounted on the inboard and outboard bearings. The wheel hub is precision-formed with a bearing surface for the inboard bearing and a bearing surface for the outboard bearing, in which the wheel hub inboard and outboard bearing surfaces are in parallel alignment with one another. The wheel hub is also formed with an axial stop surface for retaining the longitudinal position of the inboard bearing and an axial stop surface for retaining the longitudinal position of the outboard bearing, in which each one of the axial stop surfaces are perpendicular to the wheel hub inboard and outboard bearing surfaces. The wheel end assembly also includes a precision-formed spindle nut that is formed with a flat inboard surface and threads on an inner periphery of the nut, in which the flat inboard surface is perpendicular to a projected pitch diameter of the spindle nut threads. The axle spindle, wheel hub, and spindle nut cooperate to enable an axle spindle nut assembly to provide a light preload on a bearing cone and spacer group of the wheel end assembly when the axle spindle and wheel end assembly combination is in an assembled state.

This objective and others are also obtained by the method for manufacturing a precision formed axle spindle and wheel end assembly combination for a heavy-duty vehicle of the present invention. In an exemplary embodiment of the invention, an axle spindle is provided. In a first single-chuck process, a bearing surface for an inboard bearing and a bearing surface for an outboard bearing disposed longitudinally outboardly of the inboard bearing surface are formed on the axle spindle, in which the axle spindle inboard and outboard bearing surfaces are in parallel alignment with one another. In the first single-chuck process, a shoulder for retaining the longitudinal position of the inboard bearing is formed on said axle spindle, in which the shoulder is perpendicular to the axle spindle inboard and outboard bearing surfaces. Threads for receiving a spindle nut are formed on the axle spindle, in which the axle spindle threads are aligned with the axle spindle inboard and outboard bearing surfaces. A wheel hub is also provided, and in a second single-chuck process, a bearing surface for the inboard bearing and a bearing surface for the outboard bearing are formed on the wheel hub, and the wheel hub inboard and outboard bearing surfaces are in parallel alignment with one another. An axial stop surface for retaining the longitudinal position of the inboard bearing and an axial stop surface for retaining the longitudinal position of the outboard bearing are formed on the wheel hub, in which each one of said axial stop surfaces is perpendicular to the wheel hub inboard and outboard bearing surfaces. The inboard bearing is immovably mounted on the axle spindle at the axle spindle inboard bearing surface and shoulder, and the outboard bearing is immovably mounted on the axle spindle at the axle spindle outboard bearing surface. The wheel hub is rotatably mounted on the inboard and outboard bearings, and a spindle nut is provided. A flat inboard surface and threads on an inner periphery are formed on the spindle nut, in which the flat inboard surface is perpendicular to a projected pitch diameter of the spindle nut threads. The spindle nut assembly is mounted on the axle spindle, and the axle spindle, wheel hub, and spindle nut cooperate to enable an axle spindle nut assembly to provide a light preload on a bearing cone and spacer group of the wheel end assembly.

BRIEF DESCRIPTION OF THE SEVERAL VIEWS OF THE DRAWINGS

The preferred embodiment of the present invention, illustrative of the best mode in which Applicants have contemplated applying the principles, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
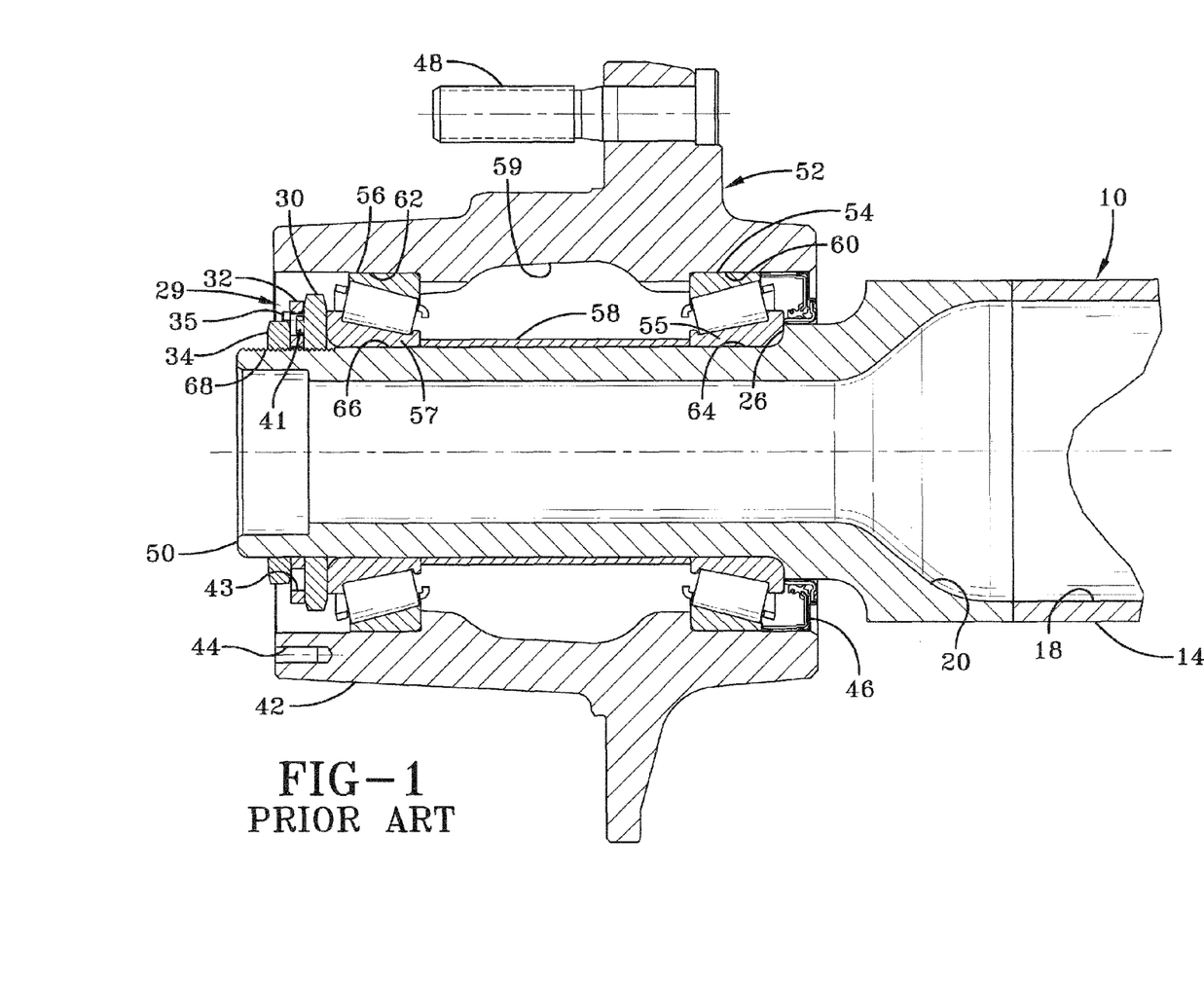
FIG. 1 is a fragmentary longitudinal cross-sectional view of a portion of a central tube of a prior art axle, and a prior art axle spindle and wheel end assembly including a bearing spacer.

In order to better understand the axle spindle and wheel end assembly of the present invention, a prior art axle spindle and wheel end assembly for a heavy-duty vehicle are shown in FIG. 1 and now will be described. An axle 10 depends from and extends transversely across the trailer of a heavy-duty tractor-trailer (not shown). A typical heavy-duty tractor-trailer includes one or more non-drive axles 10 suspended from the trailer, with each of the axles having a wheel end assembly 52 mounted on each end of the axle. Since each of the ends of axle 10 and its associated wheel end assembly 52 are generally identical, only one axle end and wheel end assembly 52 will be described herein. Axle 10 includes a central tube 14, and an axle spindle 50 is integrally connected by any suitable means, such as welding, to each end of the central tube. Axle central tube 14 generally is tubular-shaped and is formed with an internal cavity 18. Axle spindle 50 is formed with a corresponding internal cavity 20.

Wheel end assembly 52 includes a bearing assembly having an inboard bearing 54 including its bearing cone 55, and an outboard bearing 56 including its bearing cone 57, each of which is immovably mounted on the outboard end of axle spindle 50. That is, inboard bearing 54 is mounted on the outer diameter of axle spindle 50 and has its inboard surface in abutment with a shoulder 26 formed in the axle spindle, and outboard bearing 56 is mounted on the axle spindle near the outboard end of the axle spindle. A cavity 59 is defined by inboard and outboard bearings 54, 56, axle spindle 50 and a wheel hub 42. A bearing spacer 58 optionally is disposed between bearings 54, 56 in cavity 59 to conveniently maintain proper spacing between the bearings. Bearing cone 55 of inboard bearing 54, bearing cone 57 of outboard bearing 56, and any bearing spacer 58 make up a bearing cone and spacer group. A prior art axle spindle nut assembly 29, which includes an inboard nut 30, a lock washer 32, an outboard nut 34, and a set screw 35, threadably engages the outboard end of axle spindle 50 to secure bearing cones 55, 57 and bearing spacer 58 of the bearing cone and spacer group in place and to provide a clamp force on the bearing cone and spacer group.

More particularly, inboard nut 30 threadably engages axle spindle 50 and abuts the outboard end of outboard bearing 56. Lock washer 32 is disposed outboardly of inboard nut 30 and includes a tab (not shown) that engages a keyway (not shown) formed in axle spindle 50 to prevent rotation of the lock washer. A nub or pin 41 that is punched or otherwise formed in inboard nut 30 extends into a selected one of openings 43 formed in lock washer 32 to provide a coarse interlock to reduce unwanted rotation of the inboard nut. However, to install lock washer 32, inboard nut 30 typically must undesirably be rotated out of position in order to enable nub 41 to align with a selected one of openings 43. Lock washer 32 also includes a plurality of tapped openings (not shown), a selected one of which threadably receives set screw 35 once outboard nut 34 has been installed. Outboard nut 34 threadably engages axle spindle 50 and abuts lock washer 32. The openings that are formed in lock washer 32 are radially proximate to wrench flats formed on outboard nut 34, so that the installation of set screw 35 in a selected opening creates a positive stop against a corresponding outer flight of the outboard nut, thereby preventing the outboard nut from rotating enough to enable undesirable rotation of inboard nut 30.

Wheel hub 42 is rotatably mounted on inboard and outboard bearings 54, 56 in a manner well known to those skilled in the art. A hubcap (not shown) is mounted on the outboard end of hub 42 by a plurality of bolts that each pass through a respective one of a plurality of openings formed in the hubcap, and threadably engage a respective one of a plurality of aligned threaded openings 44 formed in the hub. In this manner, the hubcap closes the outboard end of wheel end assembly 52. A main continuous seal 46 is rotatably mounted on the inboard end of wheel end assembly 52 and closes the inboard end of the assembly. More particularly, seal 46 is mounted on wheel end assembly 52 in a suitable manner and radially bridges hub 42 and axle spindle 50 to seal cavity 59. In order to maintain proper lubrication and operation of inboard and outboard bearings 54, 56, a suitable amount of lubricant (not shown) is introduced into cavity 59. A plurality of interference-fit studs 48 (only one shown) are used to mount a brake drum, tire rim and tire (not shown) on wheel end assembly 52.

With continuing reference to FIG. 1, prior art wheel hub 42 is formed with a bearing surface 60 for inboard bearing 54 and a bearing surface 62 for outboard bearing 56. Because bearing surfaces 60, 62 typically are machined through multi-chuck systems, they may not be in precise alignment with one another. Thus, if prior art axle spindle nut assembly 29 is adjusted to a position and thus a clamp force that is intended to achieve a light preload on bearing cones 55, 57 and spacer 58, it is likely that bearings 54, 56 will inadvertently be overloaded or over-compressed due to non-uniform loading caused by the misalignment of bearing surfaces 60, 62.

In addition, prior art axle spindle 50 includes a bearing surface 64 for inboard bearing 54, a bearing surface 66 for outboard bearing 56, and threads 68 for axle spindle nuts 30, 34. Since threads 68 typically are formed before each spindle 50 is welded to axle central tube 14, and the welding of each spindle to the central tube may create variation in alignment of the spindles relative to one another, the threads may not be aligned with bearing surfaces 64, 66. Thus, if prior art axle spindle nut assembly 29 is adjusted to a position and thus a clamp force that is intended to achieve a light preload on bearing cones 55, 57 and spacer 58, it is likely that bearings 54, 56 will inadvertently be overloaded or over-compressed due to non-uniform loading caused by the misalignment of axle spindle threads 68 relative to spindle bearing surfaces 64, 66.

Moreover, axle spindle nut assembly 29 is not precise in its adjustment, which precludes the ability of the spindle nut assembly to consistently reach the proper position and thus the clamp force to consistently achieve a light preload on bearing cones 55, 57 and spacer 58. However, even for prior art spindle nuts that are more precise than axle spindle nut assembly 29, such spindle nuts typically do not include threads that are accurately positioned perpendicular to the inboard surface of the nut, which precludes consistent achievement of a light preload on bearing cones 55, 57 and spacer 58.

As a result, prior art axle spindle 50 and wheel end assembly 52 lack the necessary precision on the above-described critical surfaces to achieve a precise position of axle spindle nut assembly 29, and thus a consistent, desirable light preload on bearing cones 55, 57 and spacer 58. These disadvantages of prior art axle spindle 50 and wheel end assembly 52 make it desirable to develop a heavy-duty axle spindle and wheel end assembly that includes a precision-formed axle, wheel hub, and axle spindle nut which cooperate to enable the axle spindle nut to consistently achieve a precise position and thus provide a light preload on the bearing cone and spacer group of the wheel end assembly. The present invention satisfies these needs, as now will be described.

Figure 2:
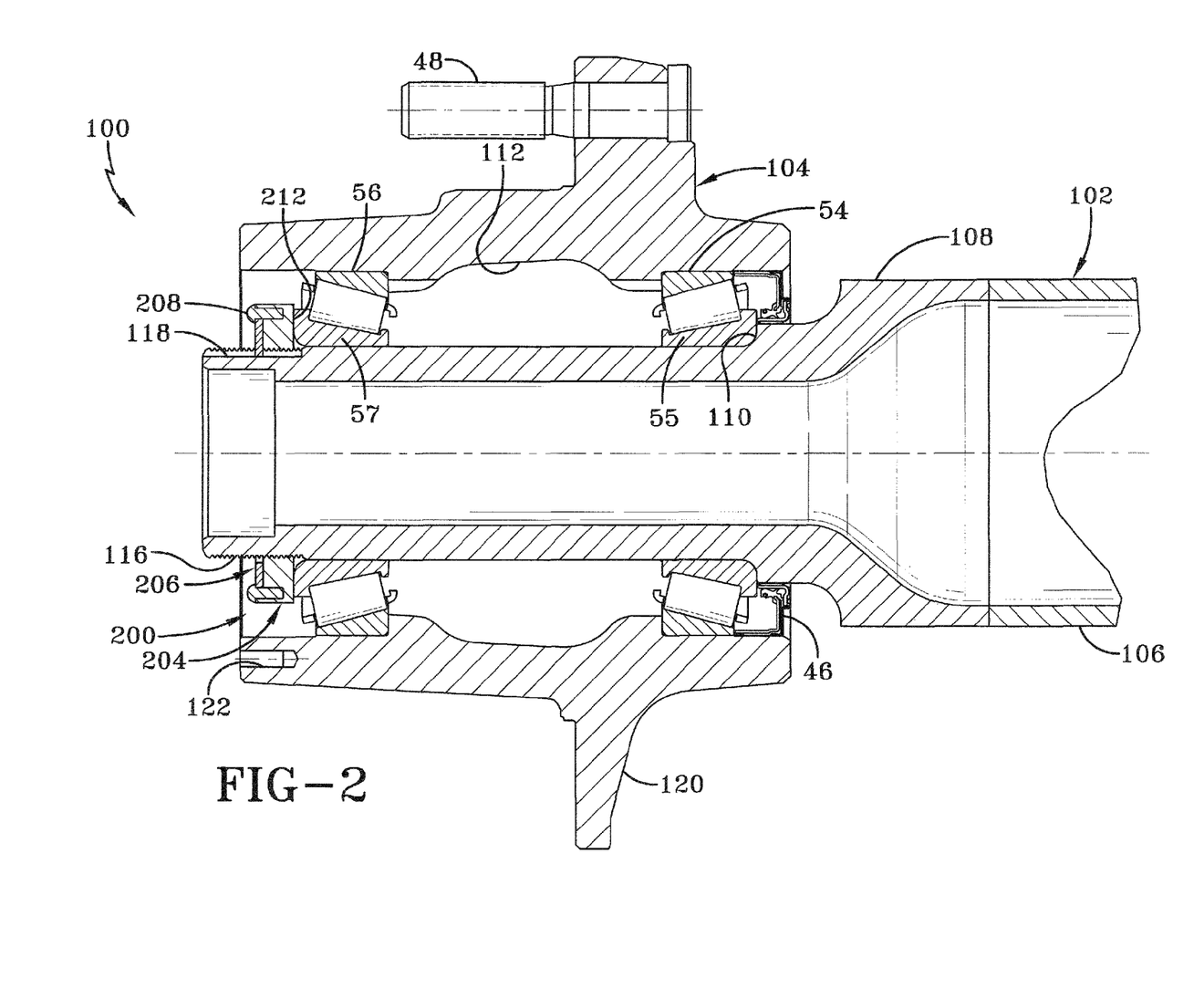
FIG. 2 is a fragmentary longitudinal cross-sectional view of a portion of a central tube of an axle, and an exemplary embodiment of an axle spindle and wheel end assembly of the present invention.

Turning now to FIG. 2, a precision axle spindle and wheel end assembly of the present invention is shown, with the axle spindle and wheel end assembly combination being indicated generally at 100, the axle portion of the invention being indicated at 102 and the wheel end assembly portion of the invention being indicated at 104. Axle 102 includes a central tube 106, and an axle spindle 108 is integrally connected by any suitable means, such as welding, to each end of the central tube.

Wheel end assembly 104 includes a bearing assembly having inboard bearing 54 including its bearing cone 55, and outboard bearing 56 including its bearing cone 57, each of which is immovably mounted on the outboard end of axle spindle 108. That is, inboard bearing 54 is mounted on the outer diameter of axle spindle 108 and has its inboard surface in abutment with a shoulder 110 formed in the axle spindle, which retains the inboard longitudinal position of the inboard bearing. Outboard bearing 56 is mounted on axle spindle 108 near the outboard end of the axle spindle. A cavity 112 is defined by inboard and outboard bearings 54, 56, axle spindle 108 and a wheel hub 120. A bearing spacer (not shown) optionally is disposed between bearings 54, 56 in cavity 112 to conveniently maintain proper spacing between the bearings. Bearing cone 55 of inboard bearing 54, bearing cone 57 of outboard bearing 56, and any bearing spacer, make up a bearing cone and spacer group.

It is to be understood that, while axle spindle 108 is shown in FIG. 2 as what is known in the art as a straight or untapered spindle, the axle spindle may also be a tapered spindle, in which the diameter of inboard bearing 54 is larger than the diameter of outboard bearing 56, without affecting the overall concept or operation of the invention.

Figure 3:
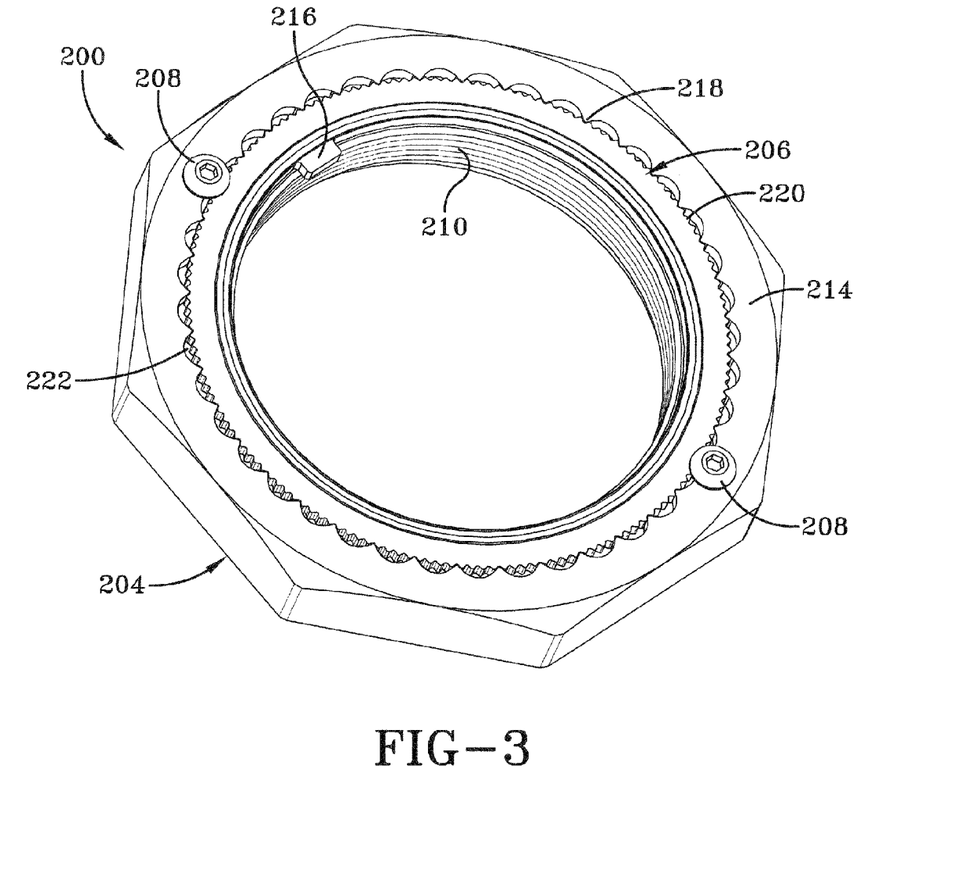
FIG. 3 is an enlarged, assembled outboard perspective view of an exemplary embodiment of an axle spindle nut assembly of the present invention for use in the axle spindle and wheel end assembly of the present invention.

With additional reference to FIG. 3, an axle spindle nut assembly 200 includes an axle spindle nut 204, an outer washer 206, and at least one screw 208. Axle spindle nut 204, washer 206 and screw 208 cooperate to secure bearings 54, 56 in place, and to provide the proper clamp load on the bearing cone and spacer group. More particularly, nut 204 includes threads 210 formed along its inner periphery, which engage threads 116 formed on the outer periphery of the outboard end of axle spindle 108. Nut 204 thus is threaded onto the outboard end of axle spindle 108 until an inboard face 212 of the nut contacts outboard bearing cone 57.

Nut 204 also includes an outboard face 214, which is formed with a recess 222 that receives outer washer 206 in an assembled state. Outer washer 206 is formed with a tab 216 on its inner periphery, which engages a keyway 118 formed in axle spindle 108 to prevent the outer washer from rotating once it is installed on the axle spindle. Radially inwardly extending teeth 218 are formed on nut 204, and positively mechanically engage and interlock with mating radially outwardly extending teeth 220 that are formed on outer washer 206. Preferably, about forty (40) teeth 218 are formed on nut 204, and teeth 220 formed on outer washer 206 are smaller than the nut teeth, so that there are multiple outer washer teeth, such as about three or four washer teeth, for every nut tooth. In addition, tab 216 preferably is offset relative to outer washer teeth 220 by one-half of a tooth. Such a configuration for nut 204 and outer washer 206 enables the outer washer to interlock with the nut without having to rotate the nut further once it has been rotated the desired amount on axle spindle threads 116.

Optionally, axle spindle nut assembly 200 may include an inner washer (not shown), which is disposed between inboard face 212 of spindle nut 204 and outboard bearing cone 57 when the spindle nut assembly is in assembled state. If an inner washer is employed, the inner washer preferably includes flat inboard and outboard surfaces that are similar to flat inboard surface 212 of spindle nut 204, which is described in detail below.

With particular reference again to FIG. 2, wheel hub 120 is rotatably mounted on inboard and outboard bearings 54, 56 in a manner well known to those skilled in the art. A hubcap (not shown) is mounted on the outboard end of hub 120 by a plurality of bolts that each pass through a respective one of a plurality of openings formed in the hubcap, and threadably engage a respective one of a plurality of aligned threaded openings 122 formed in the hub. In this manner, the hubcap closes the outboard end of wheel end assembly 104. A main continuous seal 46 is rotatably mounted on the inboard end of wheel end assembly 104 and radially bridges hub 120 and axle spindle 108 to seal cavity 112. In order to maintain proper lubrication and operation of inboard and outboard bearings 54, 56, a suitable amount of lubricant (not shown) is introduced into cavity 112. A plurality of interference-fit studs 48 (only one shown) are used to mount a brake drum, tire rim and tire (not shown) on wheel end assembly 104.

Figure 4:
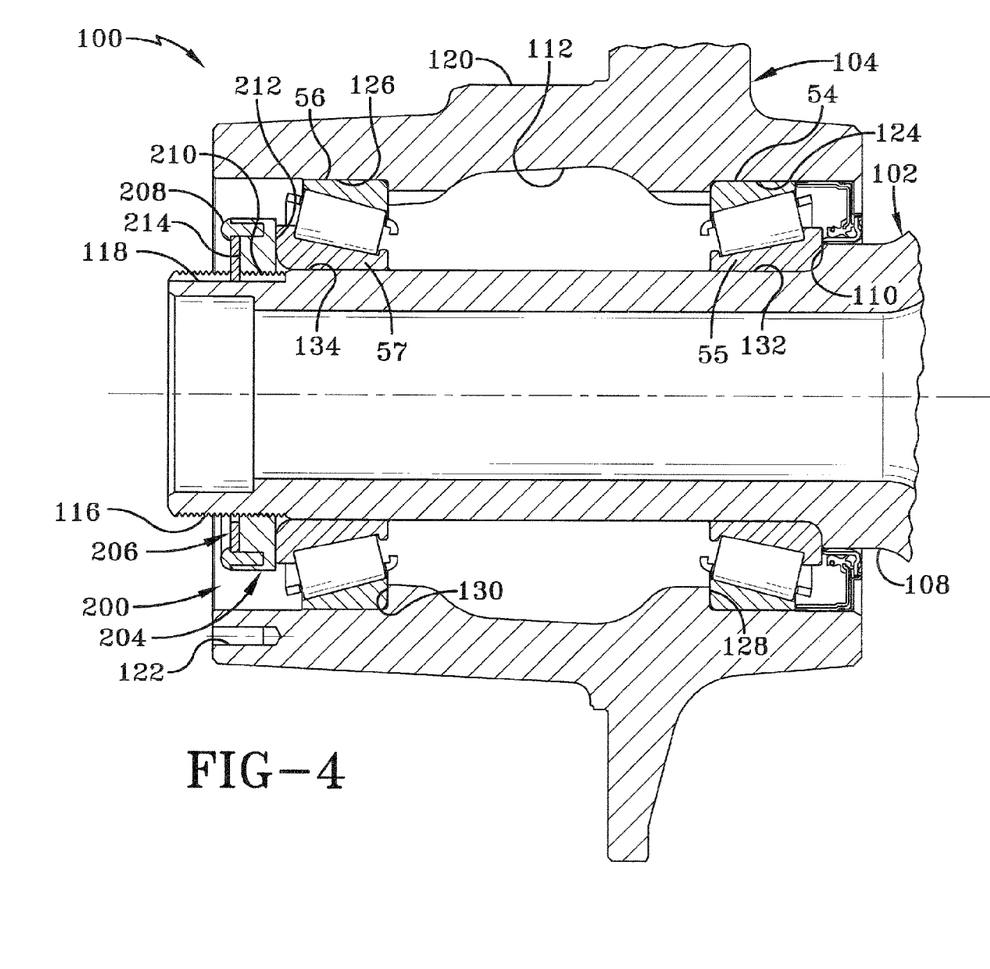
FIG. 4 is an enlarged, fragmentary cross-sectional view of the wheel end assembly and an outboard portion of the axle spindle shown in FIG. 2.

With reference now to FIG. 4, the critical surfaces of precision axle spindle and wheel end assembly of the present invention 100 are shown. More particularly, turning first to wheel hub 120, the wheel hub is formed with a bearing surface 124 for inboard bearing 54 and a bearing surface 126 for outboard bearing 56. Both bearing surfaces 124, 126 are machined in the same machining process or pass, which is referred to herein as a single chuck process, preferably using one fixture to hold hub 120 during the machining process. Such a single-chuck process ensures that bearing surfaces 124, 126 are in precise parallel alignment with one another. Measurements of hub 120 indicate that bearing surfaces 124, 126 are aligned with one another within 2 minutes of one degree, or one-thirtieth of one degree, which thereby indicate precise alignment.

Wheel hub 120 is shown in FIG. 4 as a wheel hub that is used in combination with straight or untapered axle spindle 108. In such a case, the precise parallel alignment of bearing surfaces 124, 126 with one another is based upon or along the same plane or line. However, wheel hub 120 may be used in combination with a tapered axle spindle, in which the diameter of inboard bearing 54 is larger than the diameter of outboard bearing 56. In such a case, wheel hub 120 is correspondingly formed with an inboard bearing surface 124 that is a larger diameter than outboard bearing surface 126, and these bearing surfaces are in precise parallel alignment with one another. More particularly, when wheel hub 120 is used with a tapered axle spindle, the precise parallel alignment of bearing surfaces 124, 126 with one another is based upon or along separate, spaced-apart planes or lines, which are parallel to one another.

Wheel hub 120 is also formed with an axial stop surface or cup seat surface 128 for inboard bearing 54 and an axial stop surface or cup seat surface 130 for outboard bearing 56. Axial stop surface 128 for inboard bearing 54 retains the outboard longitudinal position of the inboard bearing when wheel end assembly 104 is assembled, and axial stop surface 130 for outboard bearing 56 retains the inboard longitudinal position of the outboard bearing when the wheel end assembly is assembled. It is desirable for axial stop surfaces 128, 130 to be as precisely perpendicular to bearing surfaces 124, 126 as possible to contribute to creating an optimum alignment of wheel hub 120 relative to axle spindle 108. To accomplish precise perpendicularity, both axial stop surfaces 128, 130 are machined in the same machining process or pass as bearing surfaces 124, 126. Forming axial stop surfaces 128, 130 in the same single-chuck machining process as bearing surfaces 124, 126 ensures that the axial stop surfaces are precisely perpendicular to the bearing surfaces, thereby increasing the precision of the critical surfaces of wheel hub 120. Measurements of hub 120 indicate that axial stop surfaces 128, 130 are perpendicular to bearing surfaces 124, 126 within from about 0.0001 inches to about 0.0003 inches, thereby indicating a precise perpendicular relationship between each respective axial stop surface and bearing surface.

As a result, wheel hub 120 of the axle spindle and wheel end assembly of the present invention 100 is formed with precise, critical bearing surfaces 124, 126 and axial stop surfaces 128, 130.

Turning next to axle spindle 108, preferably, each axle spindle is attached to axle central tube 106 (FIG. 2) by means known in the art, such as welding, before the critical surfaces described below are formed or machined on each axle spindle. Such attachment of each spindle 108 to axle central tube 106 prior to the formation of critical surfaces contributes to the achievement of aligned critical surfaces of axle spindle and wheel end assembly of the present invention 100.

With continuing reference to FIG. 4, axle spindle 108 is formed with a bearing surface 132 for inboard bearing 54 and a bearing surface 134 for outboard bearing 56. Bearing surfaces 132, 134 are in precise parallel alignment with one another. Axle spindle 108 is shown in FIG. 4 as a straight or untapered axle spindle. In such a case, the precise parallel alignment of bearing surfaces 132, 134 with one another is based upon or along the same plane or line. However, axle spindle 108 may be a tapered axle spindle, in which the diameter of inboard bearing 54 is larger than the diameter of outboard bearing 56. In such a case, axle spindle 108 is formed with an inboard bearing surface 132 that is a larger diameter than outboard bearing surface 134, and these bearing surfaces are in precise parallel alignment with one another. More particularly, when axle spindle 108 is a tapered axle spindle, the precise parallel alignment of bearing surfaces 132, 134 with one another is based upon or along separate, spaced-apart planes or lines, which are parallel to one another.

Axle spindle 108 is also formed with a shoulder 110 to retain the longitudinal position of inboard bearing 54. In addition, as mentioned above, axle spindle 108 is also formed with threads 116 to receive axle spindle nut 204. Preferably, inboard bearing surface 132, outboard bearing surface 134, and shoulder 110 are formed on axle spindle 108 in the same single-chuck same machining process or pass. More preferably, threads 116 preferably are cut or formed on axle spindle 108 in the same machining process or pass that is used to form inboard bearing surface 132, outboard bearing surface 134, and shoulder 110.

Forming threads 116, bearing surfaces 132, 134 and shoulder 110 in the same single-chuck process ensures that the shoulder is perpendicular to the bearing surfaces, and that the threads are parallel to the bearing surfaces. For example, measurements indicate that the total runout, or variation from a true circle, of bearing shoulder 110 is less than about 0.001 inches, statistically within six sigma, that is, with about 99.9997% efficiency. As a result, shoulder 110 is essentially precisely perpendicular to bearing surfaces 132, 134.

Figure 5:
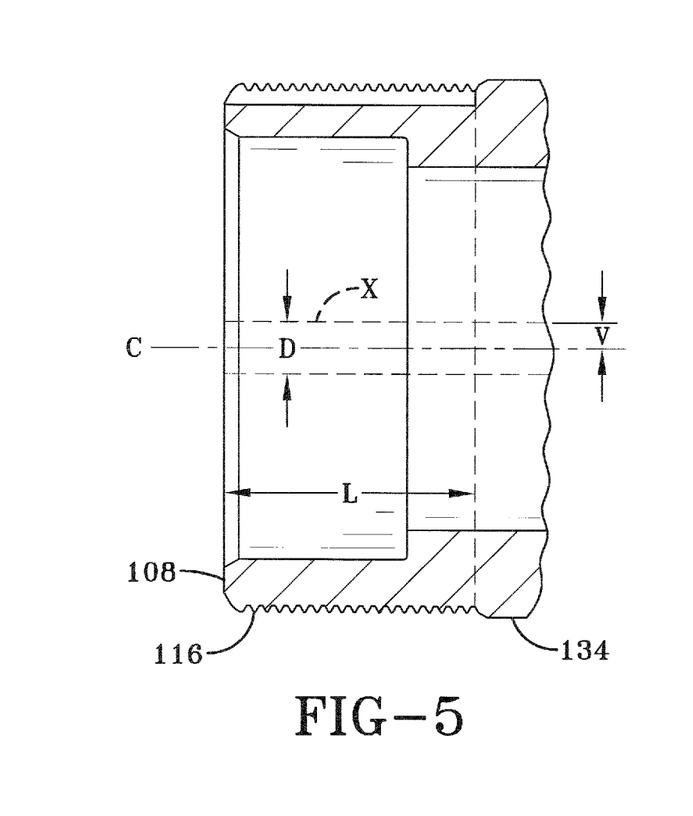
FIG. 5 is a greatly enlarged, fragmentary cross-sectional view of an outboard portion of the axle spindle shown in FIG. 2.

Measurements of axle spindle threads 116 relative to axle spindle bearing surfaces 132, 134 (FIG. 4) indicate the precise alignment of the threads to the bearing surfaces. More particularly, as shown in FIG. 5, the projected center of axle spindle 108 for machining of threads 116 is at C. The positioning tolerance of projected axle spindle center C for the entire pitch diameter of threads 116, which is indicated by D, is about 0.005 inches, which yields an acceptable radius or variance V of about 0.0025 inches from the projected axle spindle center. Positioning tolerance D and variance V thus create a theoretical cylinder X of precise alignment for the pitch diameter of threads 116. Cylinder X is centered about projected axle spindle center C, has diameter D of about 0.005 inches, and has a length L that corresponds to the length of threads 116.

With a typical length L for threads 116 being about 1.500 inches and variance V being about 0.0025, a ratio of the length to the variance (L/V) is about 600. Such a ratio is only obtainable if threads 116 are made in the same operation as bearing surfaces 132, 134. This ratio is a much more favorable ratio than was found in the prior art, in which threads often had a tolerance of about 0.010 inches, at best, and thus a variance V of about 0.005 inches, which for a thread length L of about 1.500 inches yields a ratio of only about 300. In addition, variance V of about 0.0025 for axle spindle 108 of the present invention statistically is within six sigma, that is, at about 99.9997% efficiency.

Figure 6:
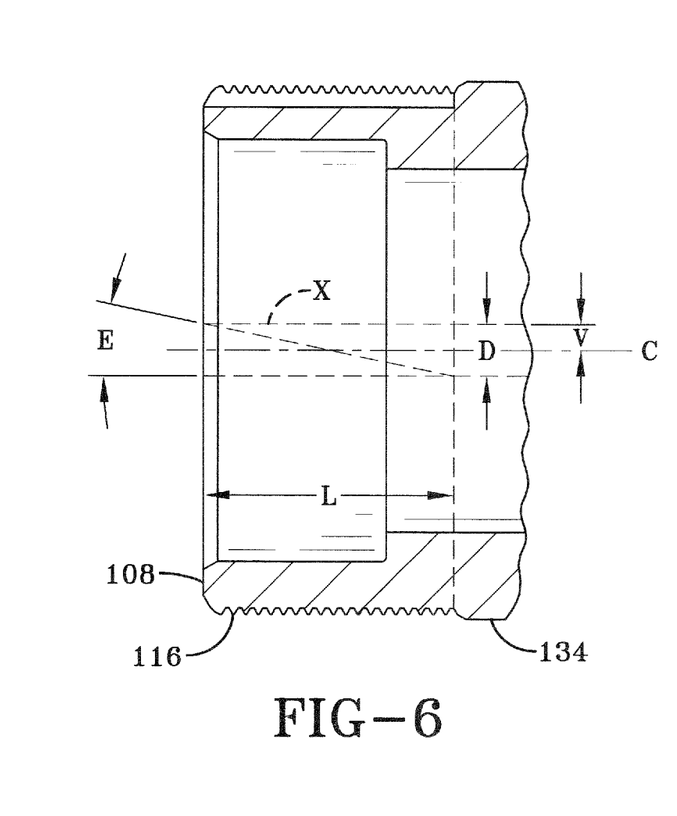
FIG. 6 is another greatly enlarged, fragmentary cross-sectional view of an outboard portion of the axle spindle shown in FIG. 2.

With reference now to FIG. 6, the precise alignment of axle spindle threads 116 to bearing surfaces 132, 134 can also be indicated by angle E. Angle E is the angle along thread length L that is the maximum acceptable angle or deviation about projected axle spindle center C. To calculate angle E, positioning tolerance D is divided by thread length L, and the arctangent of the resulting value is taken (E=arctan(D/L)). In axle spindle 108 of the present invention, angle E is equal to the arctangent of a value of positioning tolerance D of about 0.005 divided by a value of L of about 1.500, or the arctangent of about 0.003, which is an angle of about 0.172 degrees, an angle that is within a precise range of projected axle spindle center C. In contrast, prior art axle spindle 50 (FIG. 1) has variance V of about 0.010 inches at best, and angle E thus is the arctangent of about 0.010 divided by about 1.500, or the arctangent of about 0.007, which yields a wider and thus less desirable angle of about 0.401 degrees. Such a wider angle or deviation E from projected axle spindle center C creates less precise alignment between threads 116 and bearing surfaces 132, 134.

Alternatively, there may be situations in which it is not practical to cut or form threads 116 in the same machining process or pass that is used to form inboard bearing surface 132 and outboard bearing surface 134 on axle 108. For example, there may be situations in which there is a rough cut of threads 116 and axle 108 is then heat treated, which is followed by a surface grinding of the axle and final cutting of the threads. In such situations, the same reference surface or location points on axle 108 that are used to form bearing surfaces 132, 134 are used to perform the final cutting of threads 116.

As a result, axle spindle 108 of the axle spindle and wheel end assembly of the present invention 100 is formed with precise, critical bearing surfaces 132, 134, shoulder 110 and threads 116.

Figure 7:
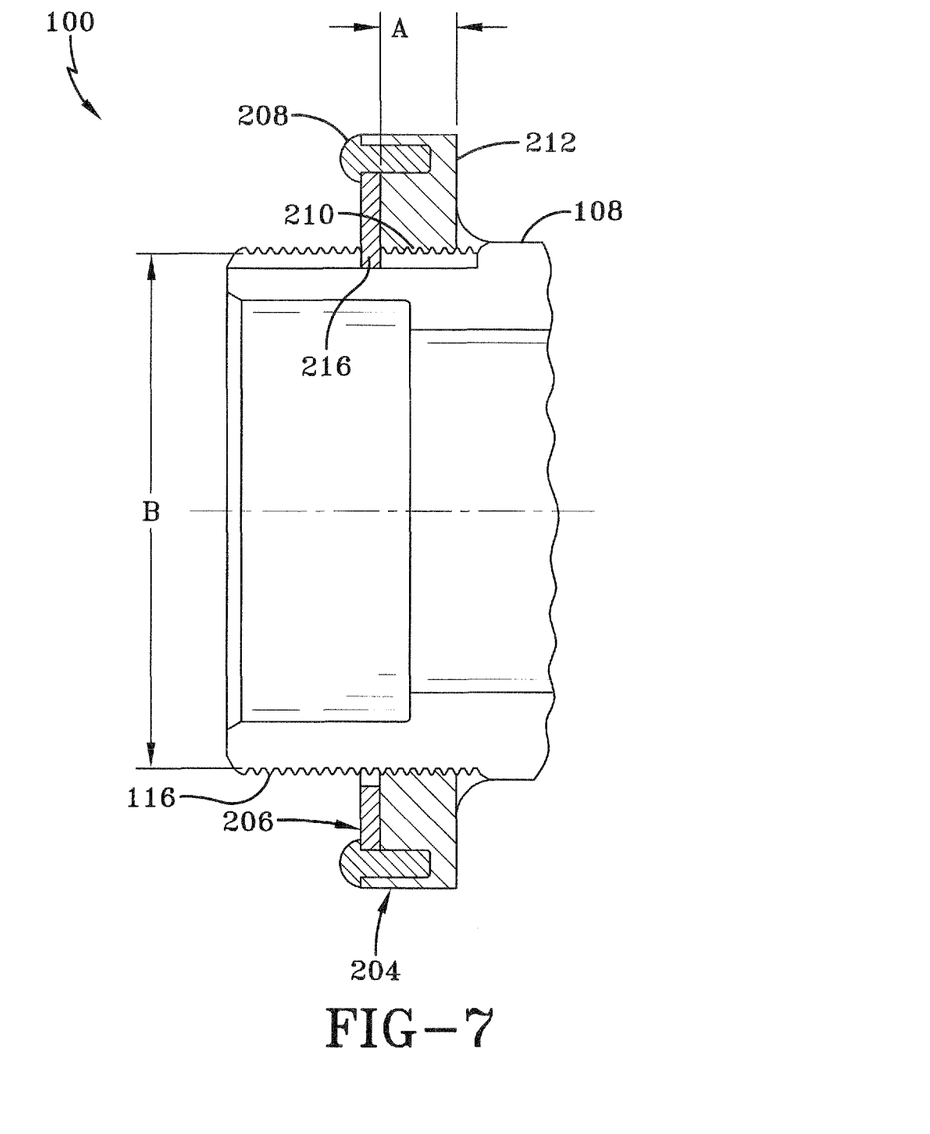
FIG. 7 is a greatly enlarged, fragmentary cross-sectional view of the spindle nut assembly and an outboard portion of the axle spindle shown in FIG. 2.

Turning next to axle spindle nut assembly 200 and FIGS. 3 and 7, spindle nut 204 is a precision nut that provides an axial positioning adjustment variation of only about +/−0.00026 inches for a major diameter of about 3.480 inches on a twelve (12) pitch thread. This precision adjustment is due to the radially-inwardly extending teeth 218 that are formed on nut 204, and which positively mechanically engage and interlock with mating radially-outwardly extending teeth 220 that are formed on outer washer 206, as described above. More particularly, when a major diameter of spindle nut thread form 210, indicated by B in FIG. 7, is about 3.480 inches, outer washer 206 includes four teeth 220 for every nut tooth 218, which provides 160 contact points. Because tab 216 is offset by one-half of one washer tooth 220, interlocking teeth 218, 220 provide three-hundred twenty (320) indexes for one revolution of spindle nut 204. On a configuration for spindle nut 204 with twelve (12) threads per inch, which is known in the art as a 12-pitch thread and is typical when major diameter B is about 3.480 inches, the spindle nut thus includes 3,840 adjustment points across one inch of axial movement.

Alternatively, when major diameter B of spindle nut thread form 210 is about 2.625 inches, outer washer 206 includes three teeth 220 for every nut tooth 218, which provides 120 contact points. Because tab 216 is offset by one-half of one washer tooth 220, interlocking teeth 218, 220 provide two-hundred forty (240) indexes for one revolution of spindle nut 204. On a configuration for spindle nut 204 with sixteen (16) threads per inch, which is known in the art as a 16-pitch thread and is typical when major diameter B is about 2.625 inches, the spindle nut thus includes 3,840 adjustment points across one inch of axial movement.

Nut 204 also includes additional features in order to ensure that axle spindle nut assembly 200 is precise enough to obtain a consistent light preload condition. More particularly, nut 204 includes a flat inboard surface 212, which is the surface that contacts outboard bearing cone 57. In addition, inboard surface 212 is precisely perpendicular to the projected pitch diameter of threads or thread form 210 formed on the inner periphery of nut 204. Forming threads 210 and inboard surface 212 of nut 204 in the same single-chuck process ensures that the inboard surface is flat and is precisely perpendicular to the threads. By machining threads 210 and inboard surface 212 in this manner, the inboard surface is flat within about 0.001 inches when it includes a major diameter of the threads that is greater than about 1.5 inches and less than about 5 inches, and preferably about 3.48 inches. Preferably, the total perpendicularity runout of inboard surface 212 relative to threaded pitch 210 is about 0.005 inches, which is statistically within about five to six sigma. As a result, inboard surface 212 of nut 204 is flat and is essentially precisely perpendicular to threads 210.

Alternatively, there may be situations in which it is not practical to cut or form threads 210 in the same machining process or pass that is used to fowl inboard surface 212 of nut 204. In such situations, thread form 210 and nut inboard surface 212 are machined relative to an accurate reference surface, such as nut outboard surface 214, in which a cleanliness check of the reference surface must be verified when nut 204 is machined.

As a result, axle spindle nut 204 of the axle spindle and wheel end assembly of the present invention 100 is formed with a precise, critical inboard surface 212 and threads 210.

With particular reference now to FIG. 7, the precise interface of spindle nut 204 and threads 116 formed on axle spindle 108 is shown. Because threads 210 on spindle nut 204 have lash, or room for slight tipping, relative to threads 116 formed on axle spindle 108, there is freedom for the spindle nut to provide self-alignment. More particularly, spindle nut 204 generally is thin in the longitudinal direction compared to its thread size, which enables the nut to shift or self-center against the outboard surface of outboard bearing cone 57 (FIG. 4) to more evenly distribute the preload on the bearing cone and spacer group. Spindle nut 204 preferably only engages about one-half or less, and more preferably about one-quarter to one-third, of axle spindle threads 116, as opposed to prior art nut systems, which engage most of the thread length and thus cannot perform such self-alignment.

This self-alignment of nut 204 with axle spindle 108 may be quantified by a ratio of the major diameter of thread form 210 of the spindle nut, indicated by B, to the longitudinal thickness of the thread form on the spindle nut, which is represented by A. On a larger diameter version of axle spindle 108, B typically is about 3.480 inches. One type of preferred spindle nut 204 includes a value for A of about 0.542 inches, yielding a ratio of about 6.421. In the prior fastener art, conventional nut design indicates that nuts having a major diameter B of about 3.480 inches typically employ a thread form thickness A of about 2.625 inches, which yields a ratio of only about 1.326. Other prior art spindle nuts having a major diameter B of about 3.480 inches employ a thread form thickness A of about 0.900 inches, which yields a ratio of about 3.867. For preferred spindle nut 204, the ratio of the major diameter of thread form 210 of spindle nut 204 to the thickness of the thread form on the spindle nut, which is over a value of 6.000, is a much more favorable ratio for self alignment than was found in the prior art. Of course, if desired, a thicker spindle nut 204 may be employed, for example, a spindle nut with a value for A of about 0.900 inches. In such a case, the ratio of major diameter B to longitudinal thickness A is about 3.867 inches, which is a better ratio than that of the conventional nut design.

On a smaller diameter version of axle spindle 108, B typically is about 2.625 inches. One type of preferred spindle nut 204 includes a value for A of about 0.542 inches, yielding a ratio of about 4.843. Certain prior art spindle nuts having a major diameter B of about 2.625 inches employ a thread form thickness A of about 0.900 inches, which yields a ratio of about 2.917. For preferred spindle nut 204, the ratio of the major diameter of thread form 210 of spindle nut 204 to the thickness of the thread form on the spindle nut, which is over a value of 4.000, is a much more favorable ratio for self alignment than was found in the prior art. Of course, if desired, a thicker spindle nut 204 may be employed.

Through this method of manufacture and assembly and resulting structure, axle spindle and wheel end assembly of the present invention 100 provides a precision-formed wheel hub 120, axle spindle 108 and spindle nut 204 which cooperate to enable axle spindle nut assembly 200 to consistently provide a light preload on the bearing cone and spacer group of wheel end assembly 104. More particularly, the precision formation of critical interface contact areas, including bearing surfaces 124, 126 and axial stop surfaces 128, 130 on wheel hub 120; bearing surfaces 132, 134, shoulder 110 and threads 116 on axle spindle 108; and inboard surface 212 and threads 210 on axle spindle nut 204, enables repeatable alignment of axle 102 and wheel end assembly 104 in a light preload condition.

With the above relationships of critical component surfaces, the incremental adjustment of nut 204 in association with the pitch of axle spindle threads 116 enables an axial preload compression of between about 0.000 inches and about 0.002 inches. By holding wheel hub 120, axle spindle 108 and nut 204 critical surfaces accurately, the present invention enables the use of precision fine adjustment nut 204 to set a light preload that is targeted at about 0.001 inches of nominal preload displacement with an axial positioning adjustment variation of only about +/−0.00026 inches, which corresponds to three-hundred twenty (320) indexes on a twelve (12)-pitch thread for major diameter B of about 3.480 inches on a twelve (12) pitch thread. Such nominal variation enables axle spindle and wheel end assembly of the present invention 100 to be set so that a light preload condition may be consistently maintained, thereby preventing axial end play and excessive preload. Including lash and tolerances of components, the variation of the axial positioning is still less than about +/−0.0005 inches, and preferably is from about 0.000 inches to about 0.002 inches, and more preferably is from about 0.0005 inches to 0.0015 inches, which corresponds to a value of about 0.001 inches+/−about 0.0005 inches.

The control of critical surfaces by axle spindle and wheel end assembly of the present invention 100 enables the repeatable setting of preload targeting primarily of about 0.001 inches of preload, with an adjustment setting range of about 0.0007 inches to about 0.0013 inches of axial compressive displacement on the bearing components. It is considered to be acceptable if the variation of nominal and adjustment setting range maintains an axial compression displacement ranging from about 0.000 inches to about 0.002 inches.

The combination of tightly controlled surfaces of conventional wheel end components of axle spindle and wheel end assembly of the present invention 100 enables the use of desirable light preload on standard tapered bearings 54, 56 without the excessive cost and complication of unitized hub or cartridge bearings. In addition, axle spindle and wheel end assembly of the present invention 100 provides a very light tightening torque on spindle nut 204, such as typically less than about 50 foot-pounds, and can be applied to the basic geometries of conventional wheel equipment.

It is to be understood that wheel hub 120 of the axle spindle and wheel end assembly of the present invention 100 is formed with precise, critical bearing surfaces 124, 126 and axial stop surfaces 128, 130 in its own operation; axle spindle 108 of the axle spindle and wheel end assembly of the present invention is formed with precise, critical bearing surfaces 132, 134, shoulder 110, and threads 116 in its own operation; and axle spindle nut 204 of the axle spindle and wheel end assembly of the present invention is formed with a precise, critical inboard surface 212 and threads 210 in its own operation, as described above.

The present invention also includes a method for manufacturing or forming a heavy-duty axle spindle and wheel end assembly that includes a precision-formed axle, wheel hub, and axle spindle nut which cooperate to enable the axle spindle nut to provide a desirable light preload on the bearing cone and spacer group of the wheel end assembly, and a method for using a heavy-duty axle spindle and wheel end assembly that includes a precision-formed axle, wheel hub, and axle spindle nut which cooperate to enable the axle spindle nut to provide a desirable light preload on the bearing cone and spacer group of the wheel end assembly. Each method includes steps in accordance with the description that is presented above and shown in FIGS. 2-7.

It is to be understood that the present invention finds application in all types of axle spindles and wheel end assemblies known to those skilled in the art, including other types of axle spindles and wheel end assemblies than those shown and described herein and known to those skilled in the art, without affecting the concept or operation of the invention.

Accordingly, the improved heavy-duty axle spindle and wheel end assembly is simplified, provides an effective, safe, inexpensive, and efficient structure which achieves all the enumerated objectives, provides for eliminating difficulties encountered with prior art heavy-duty axle spindle and wheel end assemblies, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved heavy-duty axle spindle and wheel end assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A precision-formed axle spindle and wheel end assembly combination for a heavy-duty vehicle, said combination comprising:
   a) a precision-formed axle spindle, said spindle formed with:
      i) a bearing surface for an inboard bearing and a bearing surface for an outboard bearing disposed longitudinally outboardly of said inboard bearing surface, said axle spindle inboard and outboard bearing surfaces being in parallel alignment with one another;
      ii) a shoulder for retaining the longitudinal position of said inboard bearing, said shoulder being perpendicular to said axle spindle inboard and outboard bearing surfaces; and
      iii) threads for receiving a spindle nut, said axle spindle threads being aligned with said axle spindle inboard and outboard bearing surfaces, wherein a maximum acceptable angle along a length of the threads about a projected axle spindle center is less than about 0.300 degrees; and,
   b) a wheel end assembly rotatably mounted on said axle spindle, said wheel end assembly including:
      i) said inboard bearing immovably mounted on said axle spindle at said axle spindle inboard bearing surface and said shoulder;
      ii) said outboard bearing immovably mounted on said axle spindle at said axle spindle outboard bearing surface;
      iii) a precision-formed wheel hub rotatably mounted on said inboard and outboard bearings, said wheel hub formed with:
         a bearing surface for said inboard bearing and a bearing surface for said outboard bearing, said wheel hub inboard and outboard bearing surfaces being in parallel alignment with one another; and
         an axial stop surface for retaining the longitudinal position of said inboard bearing and an axial stop surface for retaining the longitudinal position of said outboard bearing, each one of said axial stop surfaces being perpendicular to said wheel hub inboard and outboard bearing surfaces; and
      iv) a precision-formed spindle nut, said spindle nut formed with a flat inboard surface and threads on an inner periphery of said spindle nut, said flat inboard surface being perpendicular to a projected pitch diameter of said spindle nut threads, whereby said axle spindle, said wheel hub, and the spindle nut cooperate to enable an axle spindle nut assembly to provide a uniform, consistent light preload on a bearing cone and spacer group of said wheel end assembly when said axle spindle and wheel end assembly combination is in an assembled state.

2. The precision-formed axle spindle and wheel end assembly combination for a heavy-duty vehicle of claim 1, wherein said wheel hub bearing surfaces are in parallel alignment with one another to one-thirtieth of one degree.

3. The precision-formed axle spindle and wheel end assembly combination for a heavy-duty vehicle of claim 1, wherein said wheel hub axial stop surfaces for said inboard and outboard bearings are perpendicular to said wheel hub inboard and outboard bearing surfaces within from about 0.0001 inches to about 0.0003 inches.

4. The precision-formed axle spindle and wheel end assembly combination for a heavy-duty vehicle of claim 1, wherein a total runout of said axle spindle shoulder from said axle spindle inboard and outboard bearing surfaces is less than about 0.001 inches.

5. The precision-formed axle spindle and wheel end assembly combination for a heavy-duty vehicle of claim 1, wherein a ratio of a length of said threads formed on said axle spindle to a variance of the axle spindle threads from a projected axle spindle center is a value of about 600.

6. The precision-formed axle spindle and wheel end assembly combination for a heavy-duty vehicle of claim 1, wherein a maximum acceptable angle along a length of said threads formed on said axle spindle about a projected axle spindle center is about 0.172 degrees.

7. The precision-fanned axle spindle and wheel end assembly combination for a heavy-duty vehicle of claim 1, wherein said spindle nut is formed with:
   an outboard surface that includes a recess for receiving an outer washer; and radially inwardly extending teeth that engage mating radially outwardly extending teeth formed on said outer washer.

8. The precision-formed axle spindle and wheel end assembly combination for a heavy-duty vehicle of claim 7, wherein said spindle nut is formed with at least forty of said radially inwardly extending teeth.

9. The precision-formed axle spindle and wheel end assembly combination for a heavy-duty vehicle of claim 8, wherein said outer washer is foiined with at least at least three teeth for each one of said spindle nut teeth.

10. The precision-formed axle spindle and wheel end assembly combination for a heavy-duty vehicle of claim 1, wherein when a major diameter of said threads formed on said spindle nut inner periphery is between about 1.5 inches and about 5.0 inches, said spindle nut inboard surface is flat within about 0.001 inches.

11. The precision-formed axle spindle and wheel end assembly combination for a heavy-duty vehicle of claim 1, wherein said spindle nut engages less than about one-half of said threads formed on said axle spindle.

12. The precision-formed axle spindle and wheel end assembly combination for a heavy-duty vehicle of claim 1, wherein when said spindle nut includes a thread form major diameter of about 3.480 inches and a 12-pitch thread, the spindle nut further includes about 3,840 adjustment points across one inch of axial movement.

13. The precision-formed axle spindle and wheel end assembly combination for a heavy-duty vehicle of claim 1, wherein when said spindle nut includes a thread form major diameter of about 2.625 inches and a 16-pitch thread, the spindle nut further includes about 3,840 adjustment points across one inch of axial movement.

14. The precision-formed axle spindle and wheel end assembly combination for a heavy-duty vehicle of claim 1, wherein a total perpendicularity runout of said spindle nut inboard surface relative to said spindle nut threads is about 0.005 inches.

* * * * *

UNITED STATES PATENT AND TRADEMARK OFFICE
CERTIFICATE OF CORRECTION

PATENT NO. : 8,534,770 B2
APPLICATION NO. : 12/790054
DATED : September 17, 2013
INVENTOR(S) : Jay D. White, Jeffrey S. Morris and Donald R. Hester It is certified that error appears in the above-identified patent and that said Letters Patent is hereby corrected as shown below:

In the Claims

Claim 7, Column 16, line 63: delete the word "precision-fanned" and insert therefor the word --precision-formed--.

Claim 9, Column 17, line 10: delete the word "foiined" and insert therefor the word --formed--.

Signed and Sealed this
Twenty-ninth Day of October, 2013

Teresa Stanek Rea
*Deputy Director of the United States Patent and Trademark Office*